US011506307B2

(12) United States Patent
Pipkin et al.

(10) Patent No.: US 11,506,307 B2
(45) Date of Patent: Nov. 22, 2022

(54) APPARATUS FOR ADVANCING AND RETRACTING BY HAND A SOIL PROBING ROD AND METHOD OF USING

(71) Applicants: Samuel James Pipkin, Seabrook, TX (US); Cary Clarke Johnson, League City, TX (US)

(72) Inventors: Samuel James Pipkin, Seabrook, TX (US); Cary Clarke Johnson, League City, TX (US)

( * ) Notice: Subject to any disclaimer, the term of this patent is extended or adjusted under 35 U.S.C. 154(b) by 296 days.

(21) Appl. No.: 16/873,170

(22) Filed: Feb. 19, 2020

(65) Prior Publication Data
US 2020/0248840 A1    Aug. 6, 2020

(51) Int. Cl.
*F16L 1/11*     (2006.01)
*B25G 3/26*     (2006.01)
*B25G 1/12*     (2006.01)
*B25G 1/10*     (2006.01)

(52) U.S. Cl.
CPC .............. *F16L 1/11* (2013.01); *B25G 1/102* (2013.01); *B25G 1/12* (2013.01); *B25G 3/26* (2013.01)

(58) Field of Classification Search
CPC ... B25G 3/00; B25G 3/02; B25G 3/04; B25G 3/06; B25G 3/08; B25G 3/12; B25G 3/16; B25G 3/18; B25G 3/20; B25G 3/22; B25G 3/24; B25G 3/30; B25G 3/32; B25G 3/34; B25G 3/36; B25G 3/38; B25G 1/00; B25G 1/002; B25G 1/01; B25G 1/06; B25G 1/102; B25G 1/12; A47B 95/02; F16L 1/00; F16L 1/024; F16L 1/0243; F16L 1/028; F16L 1/032; F16L 1/06; F16L 1/10; F16L 1/11; F16L 1/12; F16K 31/60; B25F 5/00; B25F 5/02; B25F 5/026; B25D 17/04; B23B 45/003; E02D 1/00
See application file for complete search history.

(56) References Cited

U.S. PATENT DOCUMENTS

| | | | | |
|---|---|---|---|---|
| 1,083,054 A * | 12/1913 | Brown | ..................... | B25G 1/00 294/58 |
| 4,162,132 A * | 7/1979 | Kress | ....................... | B25F 1/02 294/51 |
| 4,881,294 A * | 11/1989 | Riedl | ...................... | B25F 5/026 16/DIG. 40 |
| 6,807,883 B1 * | 10/2004 | Rinner | ............... | B25B 23/0035 81/177.5 |
| 7,014,232 B2 * | 3/2006 | Bosa | ........................ | B25G 1/00 294/58 |
| 2009/0152783 A1 * | 6/2009 | Sigler | .................... | E04H 17/26 269/287 |
| 2011/0173778 A1 * | 7/2011 | Wales | ..................... | B25G 1/06 16/426 |
| 2018/0333827 A1 * | 11/2018 | Ashmead | ................. | B25G 3/10 |
| 2020/0198113 A1 * | 6/2020 | Westinghouse | ......... | B25F 5/006 |

* cited by examiner

*Primary Examiner* — Robert J Scruggs
(74) *Attorney, Agent, or Firm* — The Law Office of David W. Alexander, PLLC; David W. Alexander (57) ABSTRACT

Disclosed is an apparatus and method of using that grips a rod of small diameter and uniform cross-section of metal, fiberglass, or composite material used to probe the soil to locate underground utilities in a manner that permits a user of any height or strength to ergonomically and safely advance the rod into the soil and retract the rod from the soil regardless of how deep the utility may be buried.

16 Claims, 6 Drawing Sheets

APPARATUS FOR ADVANCING AND RETRACTING BY HAND A SOIL PROBING ROD AND METHOD OF USING

CROSS-REFERENCES RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A "SEQUENCE LISTING"

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

This invention relates to apparatus that by hand-power alone aid in the safe and ergonomic advancing and retracting rods of uniform and regular cross-section used to probe the soil to locate underground facilities; such as, electrical conduit, pipelines, storage tanks, septic tanks or other buried objects. Soil probes and augers of various types have been disclosed to force down into the ground probe rods to locate underground facilities or to auger out soil samples and the like. This invention further relates to soil penetrating tools which offer protection to the user against electrical shock and injury from repetitive use. None of the previously disclosed apparatus combine the safety and ergonomic features of the apparatus disclosed here.

The background information discussed below is presented to better illustrate the novelty, non-obviousness, and usefulness of the present invention. This background information is not admitted prior art.

The U.S. energy pipeline network is composed of approximately 3 million miles of pipeline transporting natural gas, oil, and hazardous liquids. Of the nation's approximately half million miles of long-distance transmission pipeline, roughly 215,000 miles carry hazardous liquids; over two thirds of the nation's crude oil and refined petroleum products, along with other products. The U.S. natural gas pipeline network consists of around 300,000 miles of interstate and intrastate transmission. It also contains some 240,000 miles of field and gathering pipelines, which connect gas extraction wells to processing facilities.

Uncontrolled pipeline releases can result from a variety of causes, including third-party excavation, corrosion, mechanical failure, control system failure, operator error, and malicious acts. Natural forces, such as floods and earthquakes, can also damage pipelines.

In addition to underground pipelines, there are about 1,100,000 miles of underground electrical transmission and distribution lines in the United States in public right-of-way. There may be many more miles of underground electrical lines within the fence lines of manufacturing facilities and plant sites.

With some 3 million miles of underground pipelines and 1.1 million miles of underground electrical utilities, the probability of damage from excavation activities is real. The most reliable method of avoiding damage is before any excavation to safely identify and locate the buried utilities.

To aid in the detection, persons skilled in the art of locating buried utilities have defined the four quality levels of information available to the design engineer, constructor, and project manager. These are quality levels D, C, B, and A. They represent different combinations of traditional records research, site surveys, geophysical imaging techniques and locating techniques. As the quality level advances from D to A, superior technologies and processes are involved, increasing the accuracy and reliability of the collected data. The cost for obtaining underground utility data varies greatly; however, in general, the higher the quality level desired, the higher the costs will be to obtain data. The increased accuracy and reliability of the data typically result in lower probabilities of utility related damages.

The lowest quality level is Quality Level D (QL-D) which consists of information derived from existing records or oral recollection. This quality level is for planning purposes such as route selection and utility relocation costs.

The next higher level is Quality Level C (QL-C) consisting of information obtained by surveying and plotting visible above-ground utility features such as surface markers showing the routes of underground pipeline and electrical utilities and by using professional judgment in correlating this information to QL-D information.

Quality Level B (QL-B) is information obtained through the application of surface geophysical methods to determine the existence and approximate horizontal position of subsurface utilities.

Quality Level A (QL-A) provides precise horizontal and vertical location of utilities obtained by the actual exposure (or verification of previously exposed and surveyed utilities) and subsequent measurement of subsurface utilities, usually at a specific point. The three-dimensional data of location, as well as other utility attributes, are shown on plan documents. Accuracy is typically set at 15 mm vertical and set at applicable horizontal survey and mapping accuracy levels as defined or expected by the project owner. This disclosure relates to QL-A.

Among many geophysical methods used to obtain QL-B quality data, the most widely used methods are electromagnetic methods (EM), ground penetrating radar (GPR), magnetic methods (MM), and acoustic emission methods (AEM). But none of these methods achieve the quality of location demanded by QL-A.

After the use of geophysical prospecting techniques such as EM, GPR, MM, and AEM, or other lesser used methods, hand probing or vacuum excavation (potholing) methods typically follow to get the exact horizontal and vertical location of utilities, which is not yet possible by any one electronic detection method. Hand probing and vacuum extraction are part of QL-A.

For vacuum excavation or potholing in native soil, a shovel-deep 0.3-m to 0.5-m diameter hole is made at the location of the utility previously determined by other lesser quality methods. If the surface is paved, a hole is cut in the road pavement using a rotary core drill and a shallow hole made as before. After that, excavation to the depth of the utility is made using compressed air jets and/or high pressure water jets with simultaneous vacuuming of the dislodged soil and/or water. This does not normally damage an existing utility, and any hole in pavement is minimized and easily repaired.

Hand probing is performed using a soil probe rod. Hand power and body weight are the only permitted sources of force to be applied to push the rod into the ground. Driving the rod by hammer or sliding weight is strictly prohibited. It is common for the user to put a rag around the rod to serve as a handhold and friction source to help push the rod into the soil or to pull it out.

It is customary to probe and mark the underground utility every 100 to 200 feet if in a straight line and much closer where the utility bends or otherwise strays from the straight.

Acute and chronic back, shoulder, and hand injuries are known to occur when probing with currently available probe rods. The most common chronic injury is back pain caused by repeatedly pushing the rod downward or pulling it upward without an ergonomic means to grip the rod that may be positioned by the user. Acute injury frequently occurs from groin bruising due to the rod bending towards the user as it is pushed into the soil. More serious injury can occur if a metal rod contacts an energized electrical utility.

The Occupational Safety and Health Administration (OSHA) has provided some guidance regarding safety in probing for underground utilities in 29 CFR § 1926.651, "Specific excavation requirements." The regulation requires that, "when excavation operations approach the estimated location of underground installations, the exact location of the installations shall be determined by safe and acceptable means." Those with skill in the art of locating underground utilities interpret "safe and acceptable means" to include using a soil probing rod with a rod made of non-conducting material if required for safety and probing or digging solely with hand tools to precisely locate the underground installation.

Probing for underground utilities gives rise to the potential for electrical shock. The apparatus disclosed here meets or exceeds the protections against electrical shock required under 29 CFR 1910 Subpart S. 29 CFR § 1910.335(a)(1)(i) provides in part, "employees working in areas where there are potential electrical hazards shall be provided with, and shall use, electrical protective equipment that is appropriate for the specific parts of the body to be protected and for the work to be performed." 29 CFR § 1910.335(a)(2)(i) further provides, "when working near exposed energized conductors or circuit parts, each employee shall use insulated tools or handling equipment if the tools or handling equipment might make contact with such conductors or parts." A May 20, 1996 OSHA Standard Interpretation regarding 29 CFR § 1910(a)(1) and (a)(2) states that insulated hand tools conforming to American Society for Testing and Materials (ASTM) F1505, Standard Specification for Insulated and Insulating Hand Tools, rated for the voltage involved gives satisfactory protection. Hand tools tested according to ASTM F1505 as providing protection up to 1,000 VAC and 1,500 VDC are suitable for work covered under 29 CFR 1910 Subpart S.

For locating intrastate underground utilities, virtually all states require some non-powered locating methods before excavation may begin. For example: (1) Alabama requires locating any marked underground facility utilizing nonin­vasive methods, AL Code § 37-15-8; (2) Arkansas, when an underground facility is being located no power-driven tools or equipment shall be used, AR Code § 14-271-110; (3) California, excavator shall determine the exact location of the subsurface installations using only hand tools. CA Code § 4216.4; (4) Connecticut, excavator shall employ hand digging or soft digging methods only, CT PURA Reg. 16-345-4; (5) District of Columbia, person responsible for excavation shall expose the underground utility by hand digging only; DC Code § 34-2704; (6) Delaware, where excavate means any operation in which earth is disturbed by tools, operators must excavate prudently and carefully and take all reasonable steps necessary to properly protect underground utilities, DE Code 26.8.1 § 806; (7) Florida, increased protection of underground utilities requires identification by hand digging, pot holing, soft digging, vacuum excavation methods, or other similar procedures, FL Stat. § 556.105; (8) Georgia, excavator shall exercise reasonable care for the protection of the utility which shall include, hand digging, pot holing, soft digging, vacuum excavation methods, pneumatic hand tools, or other methods, GA Code § 25-9-8; (9) Hawaii, before any power-driven excavation, excavator shall determine the exact location of subsurface installations with hand tools, HI Stat. § 269E-12; (10) Idaho, excavator shall determine by hand digging precise actual location of underground facilities, ID Stat. § 55-2207; (11) Illinois, before excavating utilize precautions such as hand or vacuum methods to locate and avoid damaging underground utilities, 220 ILCS 50; (12) Indiana, take precautions to avoid penetration or destruction of the underground facilities, including their protective coatings, IN Code § 8-1-26; (13) Iowa, if excavation requires the precise location of the underground facilities be determined, the excavator shall hand dig test holes or use an appropriate alternate method, IA Code § 480.4.3; (14) Kansas, reasonable care is required to protect any underground facilities, where reasonable care includes using nonintrusive means identify the existing facilities, KS Code § 66-1809 and KS Admin. Reg. § 82-14-1(n); (15) Kentucky, excavator shall hand-dig or use nonintrusive means to avoid damage to any underground facility, KY Code §§ 367.4903, 367.4911; (16) Louisiana, plan the excavation or demolition to avoid damage to or minimize interference with underground facilities in and near the construction area, dig test pits to determine the actual location of underground utilities, LA Stat. § 40:1749.16; (17) Michigan, excavator shall use soft excavation means to prevent contact damage, including, but not limited to, hand-digging, cautious digging with non-mechanical tools, vacuum excavation methods, or pneumatic hand tools. MI Code §§ 460.723, 460.725; (18) Minnesota, excavator shall determine precise location of underground facilities, without damage, before excavating, MN Stat. § 216D.04; (19) Missouri, excavator shall determine best practice for confirming the horizontal and vertical location of underground facilities, hand or soft digging is the best practice when possible. MO Stat. § 319.026; (20) Nevada, before excavation, excavator must determine exact location of a subsurface installation with hand tools, NV Stat. 455.137; (21) New Hampshire, before excavation, excavator shall locate and identify by hand digging, pot holing, soft digging, or vacuum excavation, any affected underground facilities, NH Puc. § 805.02; (22) New Jersey, excavator shall not operate any mechanized equipment within two feet horizontally of any underground facility, unless it has been first located by hand digging, NJ Admin. Code § 14:2-3.3; (23) New Mexico, excavator shall, prior to excavating, expose underground facilities by non-mechanical means or mechanical vacuum excavation methods. NM Admin. Code § 18.60.5.15; (24) New York, verification of underground shall be accomplished by hand dug test holes, 16 NYCRR § 753-3.6; (25) North Carolina, excavator shall not perform any excavation until the precise location of any underground utility has been identified, NC Stat. § 87-122; (26) Ohio, conduct any excavation in a careful, prudent, and nondestructive manner, where nondestructive manner means using low-impact, low-risk technologies such as hand tools, or hydro or air vacuum excavation equipment, OH Code §§ 3781.25; 3781.30; (27) Oklahoma, excavator must hand-dig test holes to determine the precise location of the underground facilities in advance of excavation, OK Stat. § 63-142.6; (28) Oregon, excavator must employ hand tools or other non-invasive methods to determine exact location of the underground facility, OR Admin. Rule § 952-001-0090; (29) Pennsylvania, excavator shall employ prudent techniques, which may include hand-dug test holes, vacuum excavation or similar devices, to ascertain precise position of underground facilities, PA 2017 Act 50, Section 5; (30) Rhode Island, when underground facilities are to be exposed, only non-mechanical means shall be employed to locate the facility, RI Laws § 39-1.2-10; (31) South Carolina, excavator may not excavate until the precise location of any underground facility has been determined by non-invasive equipment specifically designed or intended to protect the integrity of the facility, SC Law § 58-36-60; (32) South Dakota, excavator shall expose any underground facility only by use of hand excavation, air cutting, water cutting, or vacuum excavation in a manner that does not cause damage, SD Admin. Rule § 20:25:03:05.03; (33) Texas, excavator must exercise reasonable care to prevent damage to any underground utility, where reasonable care includes hand digging, soft digging, vacuum excavation methods, and pneumatic hand tools, TX Admin. Code 16 § 18.10; (34) Utah, excavator must determine the exact location of the underground facility by excavating with hand tools to confirm that the excavation will not damage the underground facilities, UT Code § 54-8a-5.5; (35) Virginia, person excavating around underground utility lines shall expose the underground utility line to its extremities by hand digging within the excavation area, VA Admin. Code § 20VAC5-309-140; (36) West Virginia, excavator shall perform all excavation work in such a manner as to avoid damage, including using hand digging, when necessary, WV Code § 24C-1-5; and (37) Wyoming, when excavating, reasonable care shall require hand digging, as necessary, to protect the underground facility. WY Stat. § 37-12-302.

At the Federal level, the Pipeline and Hazardous Materials Safety Administration (PHMSA), has issued rules contained in Title 49 of the Code of Federal Regulations, §§ 196.1-196.211, "Protection of Underground Pipelines from Excavation Activity." Specifically, 49 CFR § 196.101 provides, the minimum requirements that excavators must follow to protect pipelines subject to PHMSA or state pipeline safety regulations from excavation-related damage. 49 CFR § 196.103, states, among other things, excavate with proper regard for the marked location of pipelines by taking all practicable steps to prevent excavation damage to the pipeline.

The apparatus and method of using it disclosed here meets federal and state requirements for pre-excavation location and protection of underground pipelines and electrical utilities and protection of the user against electrical shock.

2. The Current State of the Art

Current apparatus for assisting in probing for underground facilities are fixed or removable t-bar handles attached at one end of the probe rod to provide handholds for pushing the rod into or pulling it out of the soil. The t-bar handle is sometimes made of or covered with an electrically insulating material. Probe rods are typically ⅜ to ½ inch (9.5 to 12.7 millimeters) in diameter, 36 to 60 inches (914 to 1,524 millimeters) long. The rods may also have threaded ends to permit the fixing of a blunt tip or connecting additional sections for deeper probing. It is usually mild steel, but may be made of other metals or of an electrically insulating material such as fiberglass or composite materials for probing for electrical utilities.

For probe rods that have a fixed or a removable handhold or t-bar handle, regardless of the length of the rod, the most ergonomically correct position for pushing it into the soil is to have the handhold waist high at the start of the push downward and about knee high at the end of the push. The opposite is true when the rod is pulled from the soil. A handhold should be about knee high at the start of the pull upward and about waist high at the end of the pull. To avoid injury, the push downward and pull upward should be with the back straight using the legs.

For probe rods without handholds, it is customary for the user to grip the rod with gloved hands and push down or pull upward as best as possible by grip and body weight alone.

In the current state of the art, depending on the user's height, a probe rod's handhold is within the ergonomically favorable position between the waist and knees for about 2 to 3 feet of probing depth. Probing depth may be much deeper than that. To probe deeper, the user must either begin the probe with a longer rod which places the handhold over his or her head, or pull the rod out, affix an additional section, find the original hole, and then resume probing but still with the handhold over the head.

The apparatus disclosed here solves the ergonomic and safety problems presently attendant to soil probing. It may be used with probe rods of any length, both sectioned or non-sectioned. It permits the handhold to be easily fitted to or removed from the rod and adjusted by the user along its length so that the handhold is always waist high at the start of the push downward and knee high at the end of the push regardless of the user's height or depth of probing. The handhold may also be adjusted for ergonomic and safe removal of the probe rod from the hole. It has pliable and insulated handles to cushion the grip and to provide resistance to electrical shock as may be required by OSHA regulations. The probe rod handle may be used with probe rods of circular or other uniform and regular cross-sections; such as, equilateral triangle, square, pentagon, hexagon, heptagon, octagon, or other shapes of like multiple uniformly and regularly faceted cross-section.

3. Description of the Related Art Including Information Disclosed Under 37 C.F.R. 1.97 and 1.98

Although U.S. patents and published patent applications are known which disclose various apparatuses and methods of probing for and locating underground pipelines and electrical utilities, no prior art anticipates, nor in combination renders obvious, the apparatus and method of using it.

U.S. patents relevant here as prior art in the field of locating underground utilities include: U.S. Pat. No. 4,448, 264, J. W. Peyton, Ground rod driving pole; U.S. Pat. No. 4,557,409, J. E. Hecock and J. O. Mumper, Electrical grounding rod driving device; U.S. Pat. No. 4,577,053 A. M. Kies, Ground rod; U.S. Pat. No. 4,620,693, J. Vialars, et al., Pole lifting apparatus; U.S. Pat. No. 4,641,715, D. B.

Stinson and A. A. Orofino, Apparatus for driving and retracting ground rods or the like; U.S. Pat. No. 5,029,427, T. E. Jewett, Ground rod driver; U.S. Pat. No. 5,050,355, M. Pildysh, Ground anchor; U.S. Pat. No. 5,248,002, T. E. Williams, Ground rod installation method; U.S. Pat. No. 5,337,836, T. E. Williams, Ground rod installation tool; U.S. Pat. No. 5,462,126, J. D. Wallace, Ground rod driver; U.S. Pat. No. 5,487,432, J. E. Thompson, Subsurface Tool; U.S. Pat. No. 5,608,186, A. L. Collins, Jr., et al., Ground rod; U.S. Pat. No. 5,865,979, A. L. Collins, Jr., et al., Ground rod and apparatus and method for electroplating; U.S. Pat. No. 6,352,002, G. Weijer, Soil probing device with optical data transmission; U.S. Pat. No. 6,719,068, L. Jonsson, Probing device with microwave transmission; U.S. Pat. No. 7,410,008, T. J. Jahnigen, Ground rod driver; U.S. Pat. No. 7,732,707, G. H. Kim, Ground rod and connection sleeve filled with compound of electric conduction; U.S. Pat. No. 9,051,705, R. Rose, Ground rod driving tool; U.S. Pat. No. 9,206,578, R. Rose, Ground rod driving tool; and U.S. Pat. No. 10,316,482, A. T. Hoekstra, Soil probing device having a string of flexibly connected rod sections.

U.S. patent applications, including those issuing or not issuing as a patent, relevant here as prior art in the field of locating underground utilities include: U.S. Patent Appl. No. 2003/0141110, L. Jonsson, Probing device with microwave transmission; U.S. Patent Appl. No. 2006/0272835, T. J. Jahnigen, Ground rod driver; U.S. Patent Appl. No. 2009/0233470, G. H. Kim, Ground Rod and Connection Sleeve Filled with Compound of Electric Conduction; U.S. Patent Appl. No. 2013/0328549, S. Liu, Rotating Mobile Probe and Probing Rod Using the Same; U.S. Patent Appl. No. 2016/0305081, A. T. Hoekstra, Soil Probing Device having a String of Flexibly Connected Rod Sections; and U.S. Patent Appl. No. 2016/0305859, A. T. Hoekstra, Soil Probing Device having Threaded Male and Female Bayonet Columns.

BRIEF SUMMARY OF THE INVENTION

The present disclosure is directed towards an apparatus and method of using it to safely and ergonomically locate underground facilities; such as, electrical utilities, pipelines, storage tanks, septic tanks or other buried objects without damaging them or their protective coatings.

The features and other technological improvements of the apparatus, which will become subsequently apparent, reside in the details of its design and construction and method of using it as more fully described hereafter and claimed, reference being had to the accompanying drawings forming a part hereof.

BRIEF DESCRIPTION OF THE SEVERAL VIEWS OF THE DRAWINGS

1. Brief Description of the Several Views of the Drawings

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

2. Glossary

The term "300 series stainless steel" means a stainless steel with an austenitic microstructure. These grades of stainless steel have approximately 18% to 30% chromium and 6% to 20% nickel as their major alloying additions.

The term "dielectric strength" means the maximum voltage differential that the material can withstand under ideal conditions without undergoing electrical breakdown and becoming electrically conductive.

The term "dowel pin metal" means carbon steel that is hardened and ground to produce a very hard, tough brittle, metal.

The term "effective diameter" for an object with a circular cross-section means the object's diameter. For objects of other uniform and regular cross-sections; such as, equilateral triangle, square, pentagon, hexagon, heptagon, octagon, or other shapes of multiple uniformly and regularly faceted cross-section, it means the diameter of the circle that touches all the points of that object's cross-section.

The term "interference fit" means the fastening between two parts is achieved by friction after the parts are pushed together with force.

The term "machinable" or "machinable material" mean with respect to a material of fabrication that the material is capable of being cut or shaped with machine tools.

The term "mild steel" means low carbon steel; which typically contains 0.04% to 0.30% carbon. The term "nominal dimension" or "nominal" or "nominally" as referring to a dimension mean the specified dimension, which may be different than the actual dimension in the item itself. Any dimension disclosed or claimed as a "nominal dimension" or a dimension qualified as "nominal" or 'nominally" has a tolerance range; specifically, −10 percent to +50 percent of the stated dimension.

3. List of Reference Numbers

Number Description
100 Probe rod holder outfitted for soil probing
102 Probe rod holder
104 Upper probing rod
106 Safety cap
108 Rod coupling
110 Lower probing rod
112 Blunt tip 200 Securing handle
202 Latch
204 Slotted block
206 Static handle
208 Cushion and electrical insulation cover
210 Latch slot
212 Pin slot
300 Latch pin
302 Latch screw
304 Threaded end of securing handle
306 Threaded end of static handle
308 Securing handle port
310 Static handle port
312 Block pin port
314 Latch pin port
316 Block pin inner port
318 Block pin threaded port
320 Latch lock
322 Lower latch arm
324 Upper latch arm
500 Rod notch
502 Anti-slip notch
504 Latch notch
506 Rod pinch points
700 Securing pin port
702 Static pin port
704 External home position of static handle
706 Internal home position of static handle pin
708 Securing pin
710 Static pin
900 Internal home position of securing handle pin
1000 Hexagonal probe rod
1100 User

DETAILED DESCRIPTION OF THE INVENTION

1. Detailed Description of the Preferred Embodiment

Figure 1:
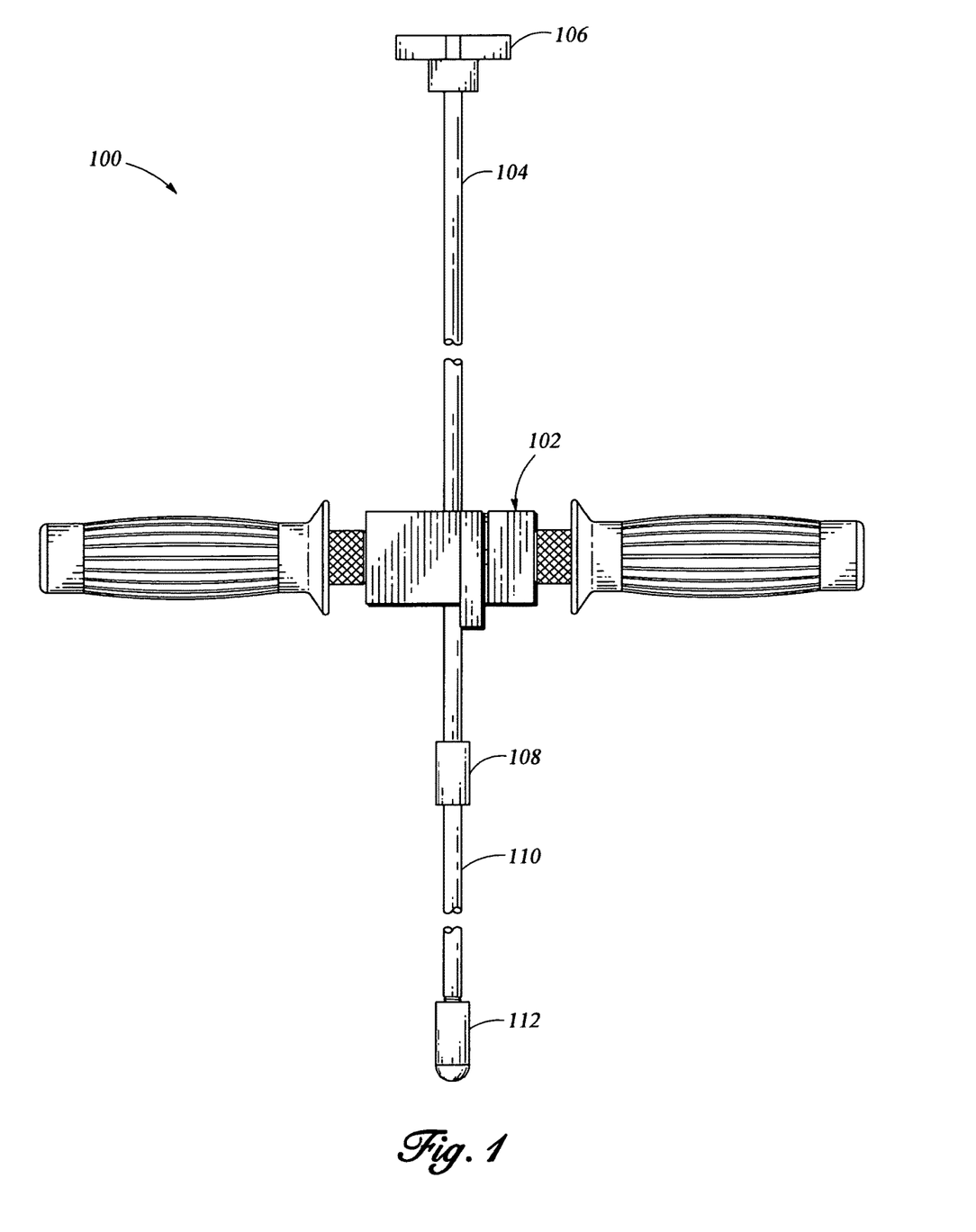
FIG. 1 shows the apparatus, with upper and lower rods, safety cap, and coupling in place and ready for use.

Item 100 in FIG. 1 shows probe rod holder 102 outfitted for use. Upper rod 104 is fitted through and secured to 102. 104 is threaded at the top to accept safety cap 106, which prevents 104 from inadvertently striking the face or upper torso of user 1100. If 104 is too short for the soil probe, rod coupling 108, may be screwed on the end of 104 and a lower rod 110 may be used to extend the reach of 104. The end of 104 or 110 is threaded and fitted with blunt tip 112. 112 is sufficiently blunt so that it will not damage a coated utility. Upper and lower rod 104 and 110 are nominally ⅜ to ½ inch (9.5 to 12.7 millimeters) diameter if circular cross-section, and 36 to 60 inches (914 to 1,524 millimeters) long, but may be longer. 104 and 110 may have other regular and uniform cross-sections; such as, equilateral triangle, square, pentagon, hexagon, heptagon, octagon, or other shapes of like multiple uniformly and regularly faceted cross-section provided the effective diameter is nominally ⅜ to ½ inch (9.5 to 12.7 millimeters). Item 1000 is an example of a rod with hexagonal cross-section, for which its effective diameter is nominally ⅜ to ½ inch (9.5 to 12.7 millimeters).

Figure 2:
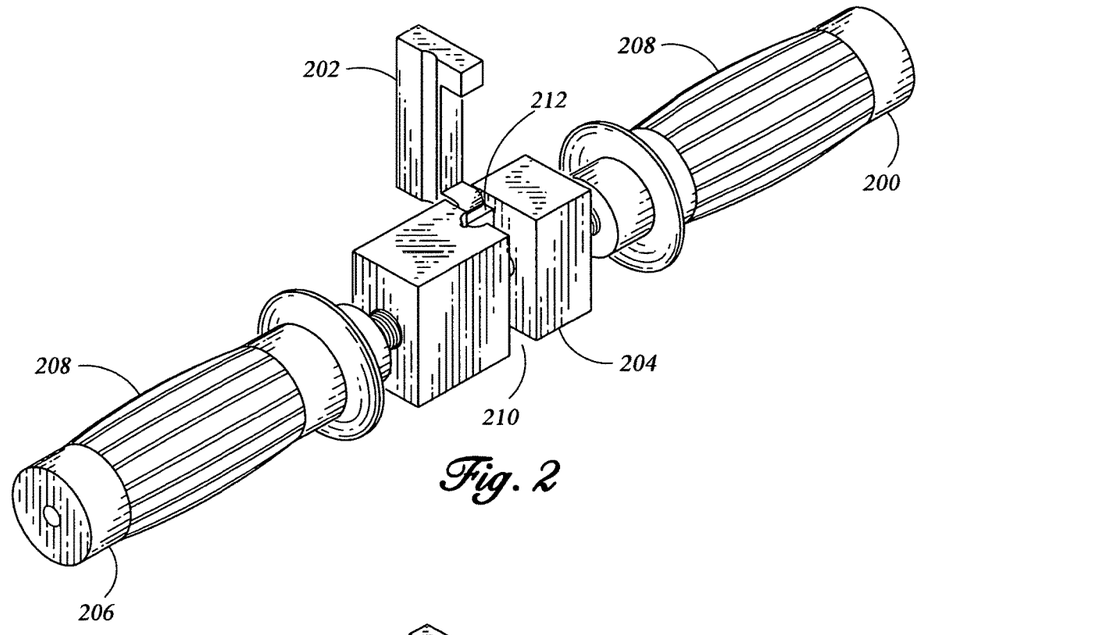
FIG. 2 depicts the apparatus with latch in the unsecured position and handles in position for securing a probing rod.

FIG. 2 shows a detail of 102. 102 comprises slotted block 204 with securing handle 200 and static handle 206 screwed into 204. Slotted block 204 has a latch slot 210 and pin slot 212. Items 200 and 206 are covered with pliable cushion and electrical insulation 208 to provide comfort to the hands of user 1100 and protection from electrical shock.

Figure 3:
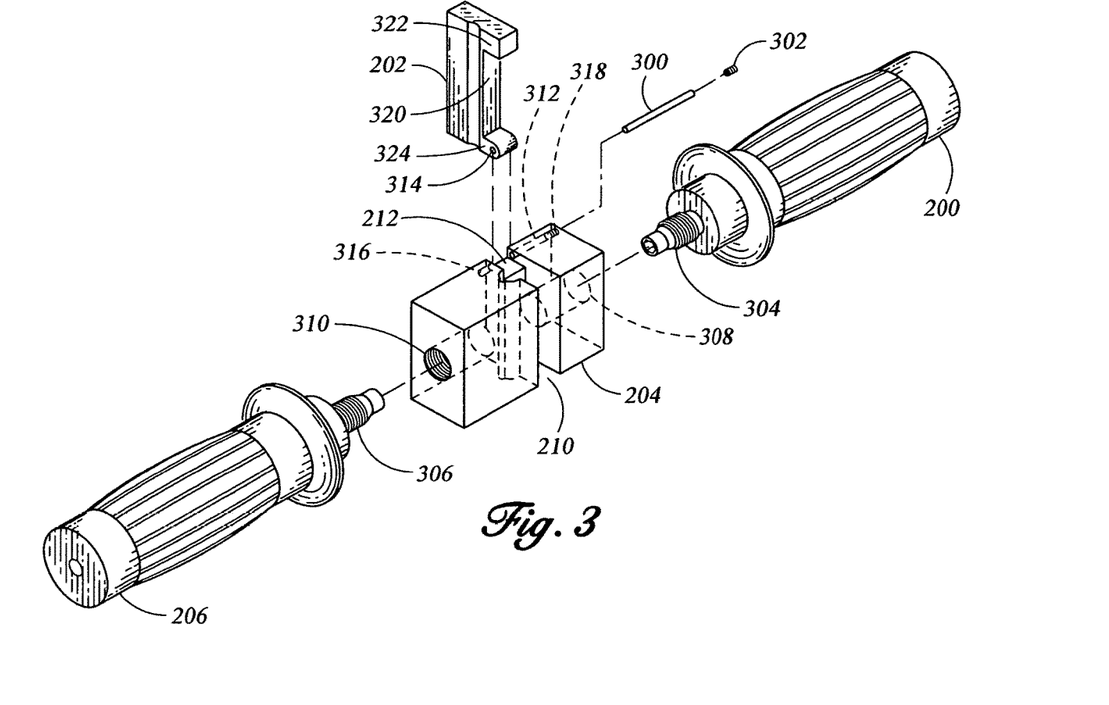
FIG. 3 shows a cut-away view of the slotted block and the handles removed.

FIG. 3 shows an expanded view of 102 with 200 and 206 removed from 102. Latch slot 210 and pin slot 212 in slotted block 204 are sized to permit 104 to be inserted into the latch slot and then to swing latch 202 into place for final securing of 104. Slotted block 204 is drilled and threaded to accept 200 and 206 at securing handle port, 308, and static handle port, 310, respectively. Item 200 has threaded male end 304 and 206 has threaded male end 306 which communicate with 308 and 310. 204 is further drilled forming block pin port 312 at a diameter slightly more than the outside diameter of latch pin 300. The outside of latch pin 300 is secured by latch screw 302 screwed into block pin threaded port 318. Slotted block 204 is further drilled forming block pin inner port 316 at a diameter slightly more than the outside diameter of 300 to slidably accept the end of latch pin 300. Latch 202 is drilled forming latch pin port 314 with an inside diameter slightly more than the outside diameter of 300 to permit sliding access of 300 through 202 at 314. Latch 202 is notched forming latch lock 320. The upper latch arm 324 and lower latch arm 322 formed by latch lock 320 communicates slidably with the bottom and top of 204, respectively, to relieve the stress on pin 300 when 102 is pushed down and or pulled up with 104 in place.

Figure 4:
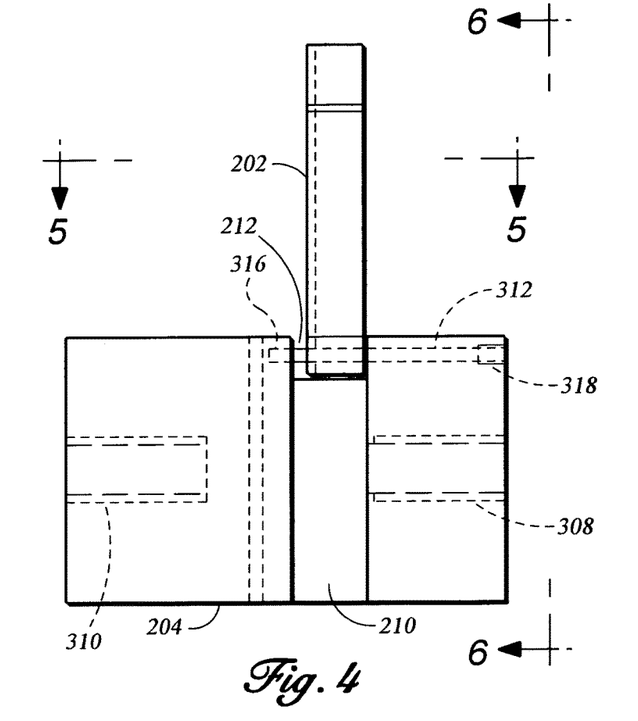
FIG. 4 illustrates a front view of the slotted block.

FIG. 4 shows the front of slotted block 204 and latch slot 210. 308 is drilled through to 210. This permits the end of 304 to push against 202 when 202 has been pivoted into 210. 310 is not drilled through to slot 210 as it is used solely to give user 1100 a balanced push or pull on 102 when 104 is secured in it. This reduces the likelihood that rod 104 will bend when it is pushed into the soil.

Figure 5:
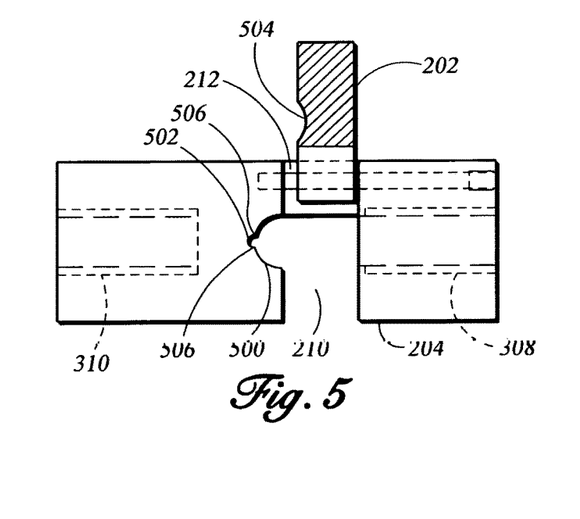
FIG. 5 shows a top view of the slotted block.

FIG. 5 depicts a top view of slotted block 204. 500 is a round indentation in slot 210 with diameter slightly larger than the diameter of rod 104. 500 is positioned in 204 so that when 104 is in the secured position the longitudinal centerline of 104 is located in the centroid or geometric center of the top of 204. The side of 500 closest to 310 is further indented at 502 to provide pinch points at 506 upon which rod 104 rests. Latch 202 has round indentation 504. When latch 202 is pivoted home in slot 210, 504 is directly opposite 500 such that 500 and 504 touch opposite surfaces of 104. With latch 202 pivoted into slot 210 and rod 104 in position for soil probing, as 200 is screwed into 308, 304 pushes against 202 forcing 202 to slide towards the opposite side of slot 210. The force applied by 304 against latch 202 causes rod 104 to be securely held in slotted block 204.

Figure 6:
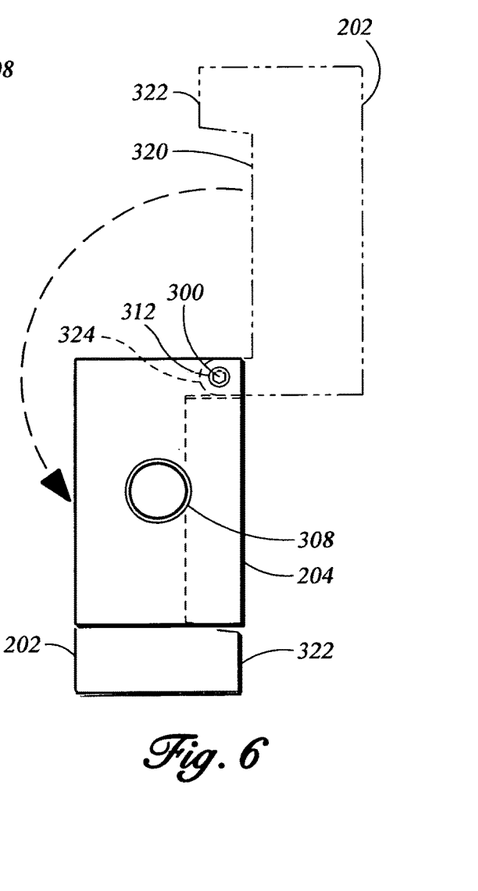
FIG. 6 depicts a side view of the slotted block with the latch open.

FIG. 6 shows side view of slotted block 204 with latch 202, with latch lock 320, upper latch arm 324, and lower latch arm 322, in the open and closed position. Once rod 104 is inserted into slot 210, latch 202 pivots about pin 300 to the closed position. Pin 300 is shown inserted in 312. Item 308 is the threaded securing handle port into which 200 is screwed. When 202 is in the closed position, latch slot 320 permits lower latch arm 322 to contact the bottom of 204 and upper latch arm 324 to contact the top of 204 limiting the vertical movement of 202.

Figure 7:
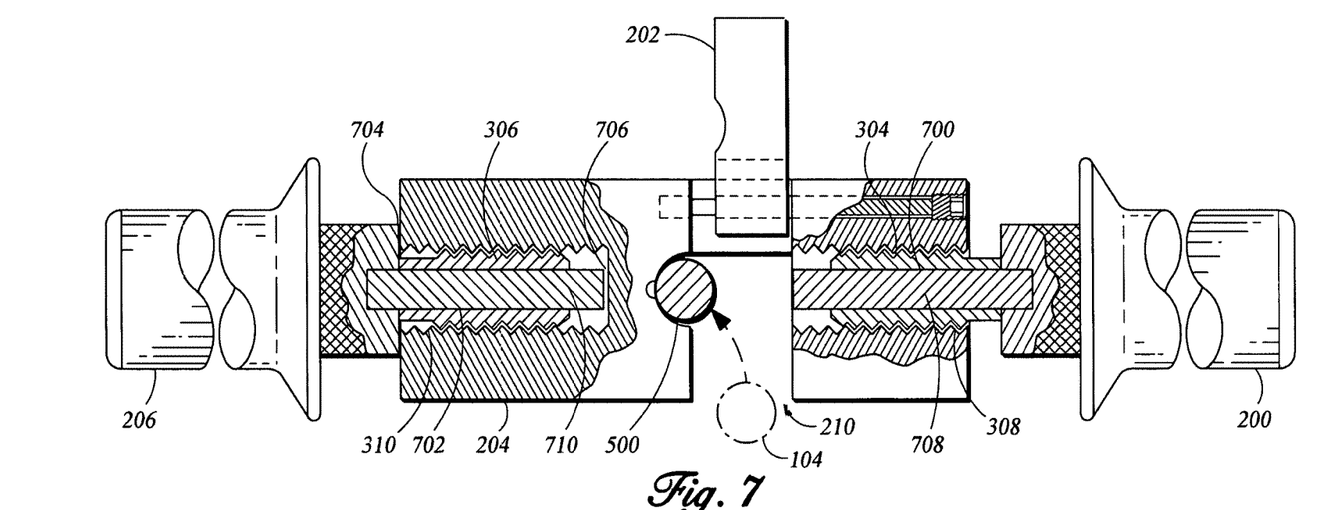
FIG. 7 illustrates a top view of the slotted block showing how to position a probe rod with circular cross-section.

FIG. 7 shows a cutaway view of slotted block 204 and positioning of rod 104 before clamping in place by 200. Items 304 and 306 are respectively the threaded ends of securing handle 200 and static handle 206. Item 304 screws into the threaded securing handle port 308 and 306 screws into the threaded static handle port 310. Item 700 is the securing pin port for securing handle 200. Securing pin 708 is fixed in 700 by interference fit. Item 702 is the static pin port for static handle 206. Static pin 710 is fixed in 702 by interference fit. Item 206 is screwed firmly into 204 until it reaches home against the exterior of 204, position 704. Position 706, internal home position of 710 shows that 710 does not touch 204 when in its home position, leaving a small gap. Securing handle 200 is shown in its rest position before securing rod 104.

Figure 8:
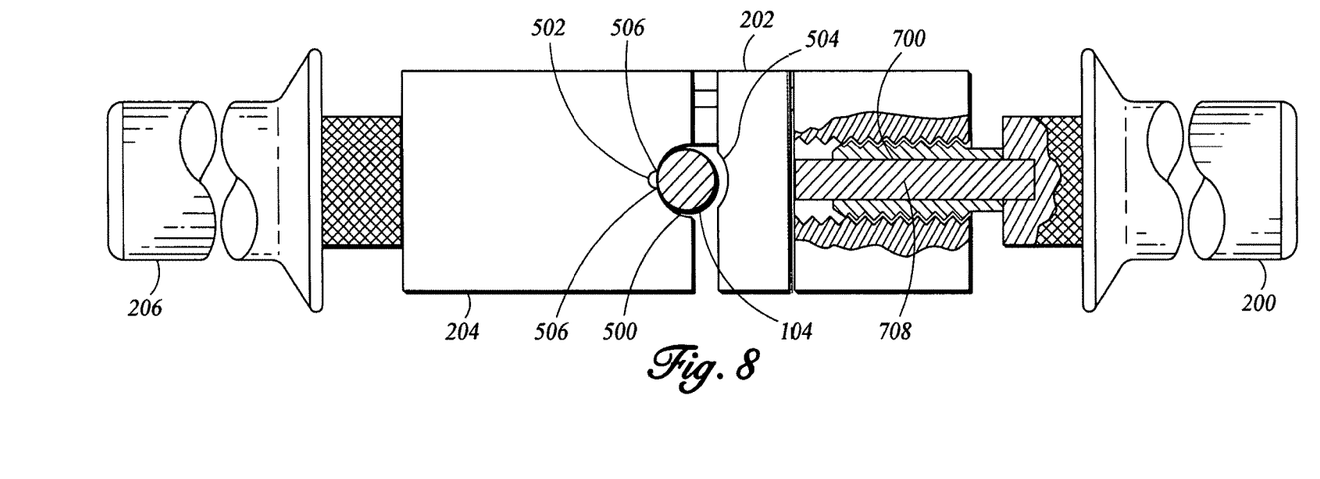
FIG. 8 shows probe rod ready to be clamped in place.

In FIG. 8, rod 104 and latch 202 are in position for clamping. The side of rod 104 towards slotted block 204 rests loosely against rod notch 500 and rod pinch points 506 formed by anti-slip notch 502. The side of rod 104 towards latch 202 is positioned loosely inside latch notch 504. Inner end of 700 rests loosely against latch 202. This permits 104 to be adjusted up or down by user 1100 before final clamping.

Figure 9:
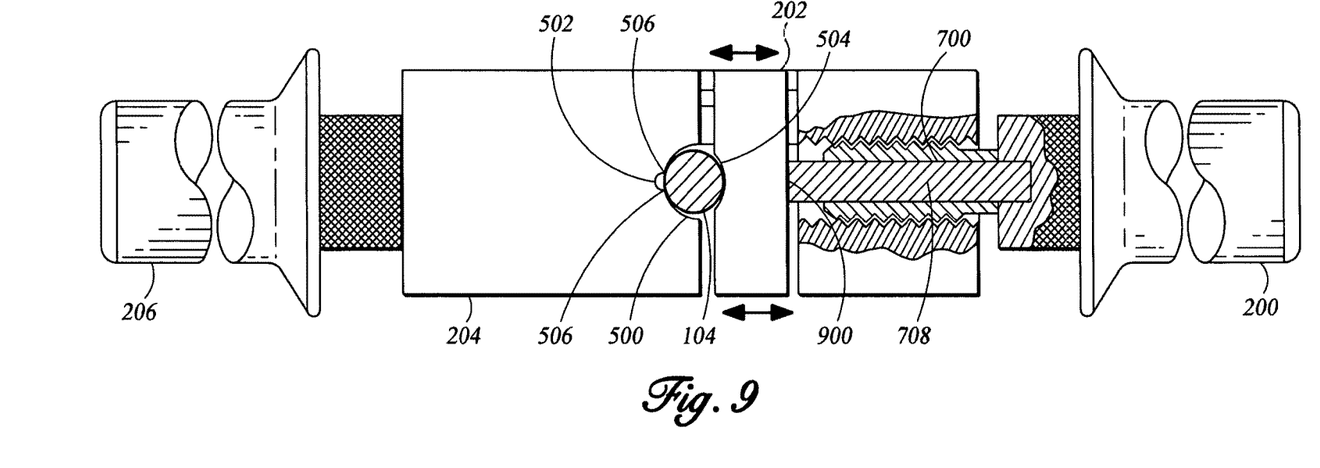
FIG. 9 shows probe rod clamped in place.

After final positioning of rod 104, as shown in FIG. 9, latch 202 is pushed hard against rod 104 by screwing 200 into slotted block 204 causing the interior end of 708 to contact the side of latch 202. This pushes 504 tight against 104 further pushing 104 tight against rod notch 500 and rod pinch points 506. User 1100 is then ready to push down on both 200 and 206 to force rod 104 and 110, if fitted, into the soil.

Figure 10:
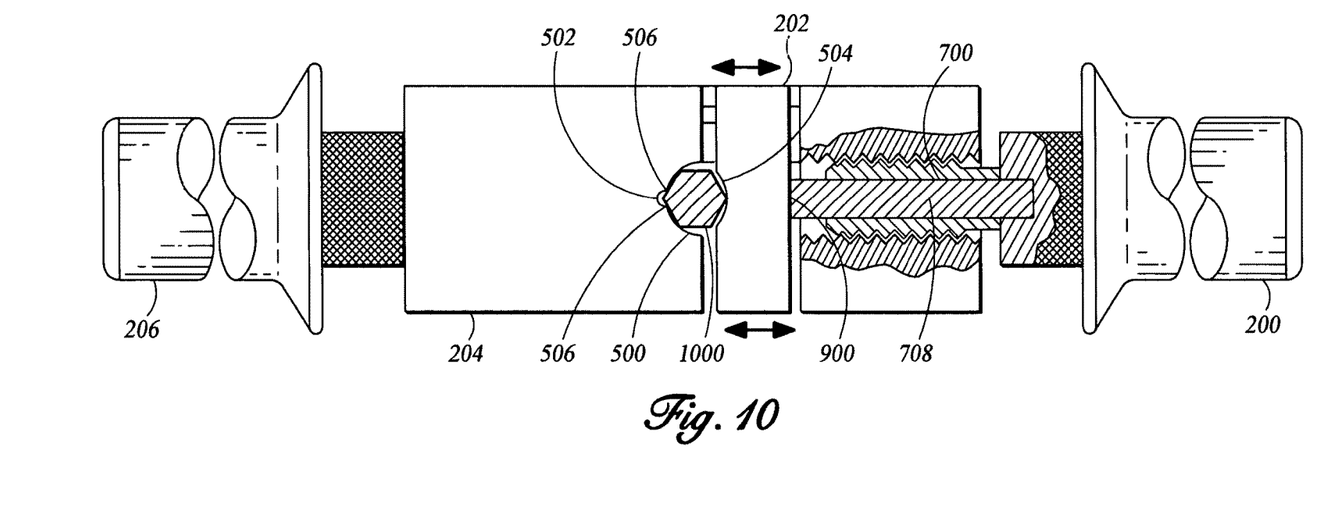
FIG. 10 depicts a probe rod with hexagonal cross-section clamped in place.

FIG. 10 shows a hexagonal rod 1000, after final positioning. Rod 1000 is positioned in 500 so that one of the six points on the hexagon fall into 502. Once positioned, latch 202 is pushed hard against rod 1000 by screwing 200 into slotted block 204 causing the interior end of 708 to contact the side of latch 202. This pushes 504 tight against 1000 further pushing 1000 tight against rod notch 500 and rod pinch points 506. User 1100 is then ready to push down on both 200 and 206 to force rod 1000 and a mating hexagonal extension, if fitted, into the soil.

In the embodiments disclosed here, materials of fabrication are: (1) slotted block 204, latch 202, securing handle 200, and static handle 206 are machinable materials with ultimate tensile strength of at least 50,000 pounds-force per square inch (PSI) and any metal, metal alloy, or composite material with such properties are within this disclosure; (2) latch pin 300 is constructed of type 300 stainless steel and any metal or metal alloy with same or similar properties are within this disclosure; (3) latch screw 302 is mild steel, or equivalent; (4) securing pin 708 and static pin 710 are dowel pin metal with a surface hardness of at least Rockwell C 60, a single shear strength of at least 11,500 pounds-force, and any pin with same or similar properties are within this disclosure; and (5) cushion and electrical insulation cover 208 comprises natural or synthetic rubber with a dielectric strength of at least 400 volts per thousandth inch and tested according to ASTM F1505 as providing electrical shock protection up to 1,000 VAC and 1,500 VDC for compliance with 29 CFR 1910 Subpart S.

Figure 11:
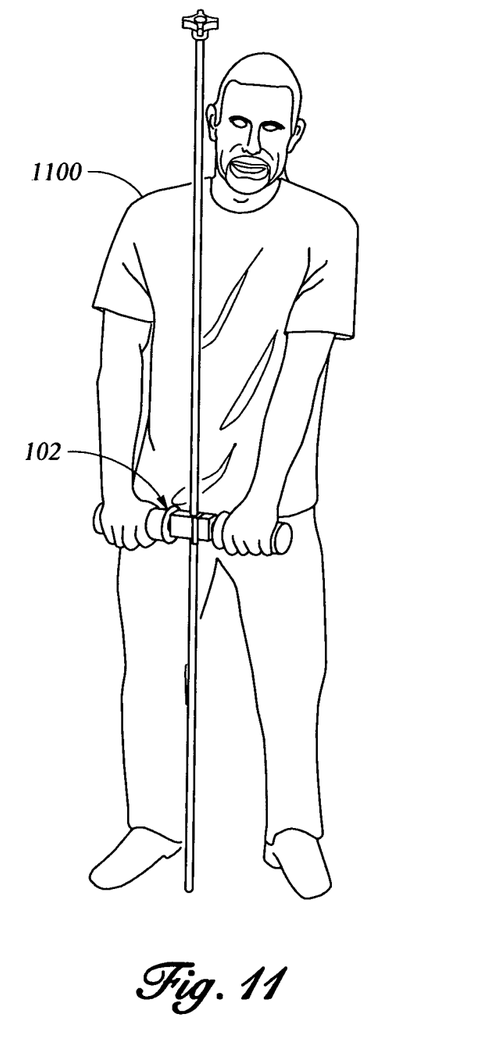
FIG. 11 depicts a user positioned to push into the ground a probe rod clamped into the apparatus.
Figure 12:
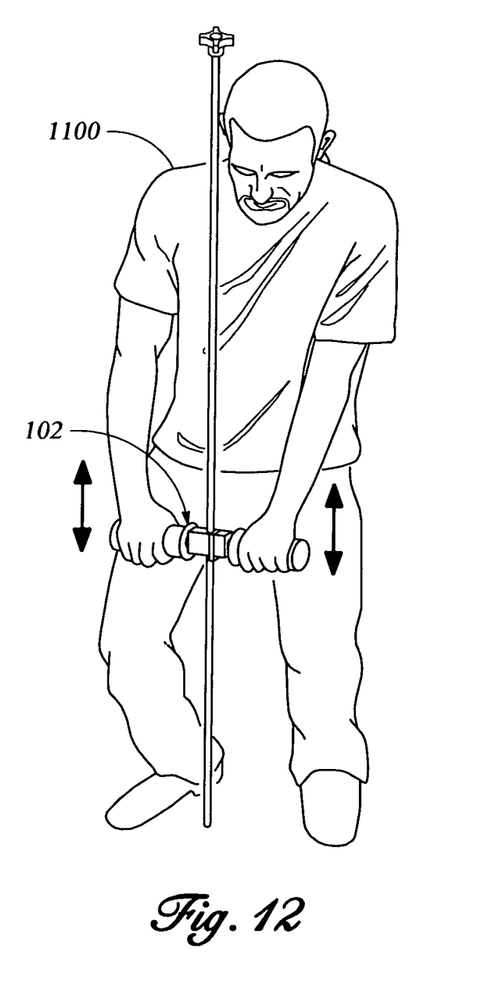
FIG. 12 shows a user pushing a probe rod into the ground or pulling it out of the ground using the apparatus.

FIGS. 11 and 12 show user 1100 in position for probing. In FIG. 10, he is shown with 102 outfitted with rod 104, safety cap 106, and clamped tight in 102. In FIG. 12, user is pushing 104 into the ground by uniformly pushing down on 200 and 206. It also shows nothing other than body weight is used for pushing 104 into the ground.

Those with skill in the art of clamping rods like 104 or 1000, would understand that the invention disclosed here would work equally well with rods made of electrically insulating materials, such as fiberglass or composite materials. They would also understand that the invention would work equally well with rods of uniform and regular cross-sections other than circular; such as, equilateral triangular, square, pentagon, hexagon, heptagon, octagon, or other shapes of like multiple uniformly and regularly faceted cross-section as long as all the points of the other cross-sections touch the perimeter of a circle with a nominal diameter of ⅜ to ½ inch (9.5 to 12.7 millimeters).

2. Detailed Description of the Method of Using the Preferred Embodiment

Referring to FIG. 1, user 1100, obtains probe rod holder 102, upper rod 104, safety cap 106 and blunt tip 112. Depending on the depth to be probed, 1100 may also obtain coupling 108 and lower rod 110. If shallow depth, 1100 uses only upper rod 104. 1100 screws 106 onto one end of 104 and 112 onto the other end. If deeper probing, 1100 screws coupling onto end of 104, screws lower rod 110 into coupling, and screws 112 onto the other end of 110.

Referring to FIG. 7, 1100 partially unscrews 200 from slotted block 204 enough to permit latch 202 to pivot out of latch slot 210. 1100 then positions rod 104 into notch 500. Static handle 206 is screwed tight.

Referring to FIGS. 6 and 8, latch 202 is pivoted into slot 210 cradling rod 104 between 500 and 504. User 1100 positions 102 up and down along 104 until it is properly positioned for ergonomic and safe soil probing. In FIG. 9, 1100 screws 200 hand tight into 204 pushing 202 towards 104 and pinching rod between 504 and 500. 100 is now ready for soil probing.

As shown in FIG. 11, user 1100 positions himself at the location of probing and takes 102 in both hands gripping 200 and 206. In FIG. 12, 1100 pushes down uniformly on 200 and 206 with body weight alone pushing 104 or 110 into the soil. Once the object to be probed is hit, 1100 pulls up on 102 to pull 104, and 110 if used, out of the soil. 1100 marks the location and depth of the underground facility according the procedure.

1100 then moves to the next position and again begins probing, contacting the object to be probed, and removing the rod as previously described.

Rod 104 may be removed from 102 by partially unscrewing 200 from slotted block 204 permitting 202 to slide away from 104. Latch 202 is then pivoted out of slot 210 releasing rod 104. 104 may then be removed from 102.

Persons of skill in the art of locating underground utilities by means of methods meeting Quality Level A (QL-A) requirements understand that the apparatus and method of using the apparatus described in the preferred embodiment can vary and still remain within the invention herein described. Variations obvious to those persons skilled in the art are included in the invention.

This written description uses examples to disclose the invention, including the preferred embodiment, and also to enable a person of ordinary skill in the relevant art to practice the invention, including making and using any apparatuses and performing any incorporated methods. The patentable scope of the invention is defined by the claims, and may include other examples that occur to those person of ordinary skill in the art. Such other examples are intended to be within the scope of the claims if they have structural elements that do not differ from the literal language of the claims, or if they include equivalent structural elements with insubstantial differences from the literal language of the claims.

Further, multiple variations and modifications are possible in the embodiments of the invention described here. Although a certain illustrative embodiment of the invention has been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

We claim:

1. An apparatus to permit a user to ergonomically and safely probe soil by hand to locate an underground facility, comprising:
   a. a rod,
   b. a slotted block comprising a latch slot, a pin slot, a rod notch, an anti-slip notch, a securing handle port, a static handle port, and a block pin port,
   c. a latch comprising an upper latch arm, a lower latch arm, a latch lock, a latch pin port, and a latch notch,
   d. a latch pin,
   e. a latch screw,
   f. a securing handle comprising a threaded end of securing handle, a securing pin port, a securing pin, and a first cover for cushion and electrical insulation, and
   g. a static handle comprising a threaded end of static handle and a second cover for cushion and electrical insulation.

2. The apparatus according to claim 1 wherein said rod comprises,
   a. an upper probing rod and a lower probing rod each comprising,
      (1) a solid cylinder of a length substantially longer than its equivalent diameter,
      (2) said solid cylinder is male threaded on each end,
      (3) said equivalent diameter is uniform along said length,
      (4) the solid cylinder is a machinable material, and
   b. a rod coupling comprising,
      (1) a hollow cylinder,
      (2) said hollow cylinder is female threaded at each end,
      (3) the hollow cylinder is a machinable material, and
   c. a blunt tip comprising,
      (1) a hollow cylinder with a closed end,
      (2) said hollow cylinder is female threaded at end opposite said closed end, and
   d. a safety cap comprising,
      (1) a cap with an end female threaded.

3. The apparatus according to claim 1 wherein,
   a. said slotted block comprises,
      (1) a solid cuboid of a machinable material having,
         (i) a block front and a block back of equal size,
         (ii) a block left side and a block right side of equal size,
         (iii) a block top and a block bottom of equal size, and
   b. said latch slot comprises,
      (1) a first rectangular slot cut into said block front extending straight downward from said block top to said block bottom,
         (i) said first rectangular slot deep enough and wide enough to permit said rod to be inserted in the first rectangular slot and a latch to loosely rotate downward to its home position, and
   c. said pin slot comprises,
      (1) a second rectangular slot cut straight downward into the block top extending enough to permit said latch to rotate freely, and
   d. said rod notch comprises,
      (1) a first semi-circular hole drilled into the block top extending straight downward from the block top to the block bottom with a first diameter slightly larger than an effective diameter of the rod,
      (2) said first semi-circular hole located so that said first diameter directly faces said block right side and center of the first diameter passes through a left edge of the first rectangular slot, and
   e. said anti-slip notch comprises,
      (1) a second semi-circular hole drilled into the block top extending straight downward from the block top to the block bottom with a second diameter smaller than the first diameter,
      (2) said second semi-circular hole located so that said second diameter directly faces the block right side and center of the second diameter passes through a left edge of the first semi-circular hole, and
   f. said securing handle port comprises,
      (1) a first hole drilled into a centroid of the block right side extending from the block right side straight through to the first rectangular slot, and
   g. said static handle port comprises,
      (1) a second hole drilled into a centroid of said block left side extending into the slotted block, and
   h. said block pin port comprises,
      (1) a third hole centered nominally in an upper right quadrant of the block right side.

4. The apparatus according to claim 1 wherein,
   a. said latch comprises,
      (1) a C-shaped solid of machinable material,
      (2) said C-shaped solid having right angles at outside top left, outside bottom left, and outside bottom right, and
   b. said upper latch arm comprises,
      (1) an upper arm of the C-shaped solid,
      (2) said upper arm having an inside right angle and end rounded to form a semi-circle, and
   c. said lower latch arm comprises,
      (1) a lower arm of the C-shaped solid,
      (2) said lower arm a solid trapezoid prism, and
   d. said latch lock comprises,
      (1) an interior of the C-shaped solid between the upper latch arm and the lower latch arm, and
   e. said latch pin port comprises,
      (1) a hole drilled through the upper latch arm,
      (2) centered in the upper latch arm, and
   f. said latch notch comprises,
      (1) a semi-circular groove in a far side of the C-shaped solid.

5. The apparatus according to claim 1 wherein,
   a. said latch pin comprises,
      (1) a solid cylinder of machinable material, and
   b. said latch screw comprises,
      (1) a screw.

6. The apparatus according to claim 1 wherein,
   a. said securing handle comprises,
      (1) a first solid cylinder of machinable material comprising,
         (i) a length and diameter to fit said user's hand, and
   b. said threaded end of securing handle comprises,
      (1) male threads, and
   c. said securing pin port comprises,
      (1) a hole drilled longitudinally into the centroid of the threaded end of securing handle, and
   d. said securing pin comprises,
      (1) a second solid cylinder of machinable material,
      (2) press fitted home into said hole, and
   e. said first cover for cushion and electrical insulation comprises, (1) an elastomeric material fitted tightly to cover said first solid cylinder over end opposite the threaded end of securing handle.

7. The apparatus according to claim 1 wherein,
a. said static handle comprises,
   (1) a first solid cylinder of machinable material comprising,
      (i) a length and diameter to fit said user's hand, and
b. said threaded end of static handle comprises,
   (1) male threads, and
c. said second cover for cushion and electrical insulation comprises,
   (1) an elastomeric material fitted tightly to cover said first solid cylinder over end opposite the threaded end of static handle.

8. The apparatus according to claim 1 wherein,
a. said rod comprises a regular cross-section having a shape of circular, equilateral triangular, square, pentagon, hexagon, heptagon, or octagon, and
b. said slotted block comprises a machinable material with an ultimate tensile strength of at least 50,000 pounds-force per square inch, and
c. said latch, said upper latch arm, and said lower latch arm each comprise a same machinable material with an ultimate tensile strength of at least 50,000 pounds-force per square inch, and
d. said latch pin comprises a 300 series stainless steel, and
e. said securing handle comprises a machinable material with an ultimate tensile strength of at least 50,000 pounds-force per square inch, and
f. said securing pin comprises dowel pin metal with a surface hardness of at least Rockwell C 60 and a single shear strength of at least 11,500 pounds-force, and
g. said static handle comprises a machinable material with an ultimate tensile strength of at least 50,000 pounds-force per square inch, and
h. said first cover for cushion and electrical insulation and second cover for cushion and electrical insulation each comprise the same natural or synthetic rubber with a dielectric strength of at least 400 volts per thousandth inch.

9. A method permitting a user to ergonomically and safely probe soil by hand to locate an underground facility, said method comprising the steps of:
a. selecting a rod,
b. assembling, in preparation to accept said rod,
   (1) a slotted block comprising,
      (i) a latch slot, a pin slot, a rod notch, an anti-slip notch, a securing handle port, a static handle port, and a block pin port,
   (2) inserting into said latch slot a latch comprising,
      (i) an upper latch arm, a lower latch arm, a latch lock, a latch pin port, and a latch notch,
   (3) positioning said latch to align said latch pin port longitudinally with said block pin port,
   (4) inserting a latch pin to a home position into the block pin port and through the latch pin port,
   (5) securing said latch pin with a latch screw,
   (6) sliding the latch along the latch pin to create a largest opening possible between said rod notch and said latch notch,
   (7) communicating rotatably a securing handle into said securing handle port until a securing pin in said securing handle communicates loosely with the latch, the securing handle comprising,
      (i) a threaded end of securing handle, a securing pin port, said securing pin, and a first cover for cushion and electrical insulation,
   (8) communicating rotatably a static handle into said static handle port to a tight home position, said static handle comprising,
      (i) a threaded end of static handle and a second cover for cushion and electrical insulation,
   (9) rotating the latch upward as far as it will traverse around the latch pin, and
c. inserting said rod longitudinally in said largest opening, and
d. rotating the latch downward as far as it will traverse around the latch pin, and
e. communicating rotatably further the securing handle into the securing handle port until the securing pin communicates with slight force against the latch, and
f. adjusting the position of the slotted block vertically up or down along the length of the rod to a place about waist high on said user, and
g. communicating rotatably still further the securing handle into the securing handle port until the securing pin communicates tightly against the latch.

10. The method according to claim 9 wherein said rod comprises,
a. an upper probing rod and a lower probing rod each comprising,
   (1) a solid cylinder of a length substantially longer than its equivalent diameter,
   (2) said solid cylinder is male threaded on each end,
   (3) said equivalent diameter is uniform along said length,
   (4) the solid cylinder is a machinable material, and
b. a rod coupling comprising,
   (1) a hollow cylinder,
   (2) said hollow cylinder is female threaded at each end,
   (3) the hollow cylinder is a machinable material, and
c. a blunt tip comprising,
   (1) a hollow cylinder with a closed end,
   (2) said hollow cylinder is female threaded at end opposite said closed end, and
d. a safety cap comprising,
   (1) a cap with an end female threaded.

11. The method according to claim 9 wherein,
a. said slotted block comprises,
   (1) a solid cuboid of a machinable material having,
      (i) a block front and a block back of equal size,
      (ii) a block left side and a block right side of equal size,
      (iii) a block top and a block bottom of equal size, and
b. said latch slot comprises,
   (1) a first rectangular slot cut into said block front extending straight downward from said block top to said block bottom,
      (i) said first rectangular slot deep enough and wide enough to permit said rod to be inserted in the first rectangular slot and a latch to loosely rotate downward to its home position, and
c. said pin slot comprises,
   (1) a second rectangular slot cut straight downward into the block top extending enough to permit said latch to rotate freely, and
d. said rod notch comprises,
   (1) a first semi-circular hole drilled into the block top extending straight downward from the block top to the block bottom with a first diameter slightly larger than an effective diameter of the rod, (2) said first semi-circular hole located so that said first diameter directly faces said block right side and center of the first diameter passes through a left edge of the first rectangular slot, and
e. said anti-slip notch comprises,
  (1) a second semi-circular hole drilled into the block top extending straight downward from the block top to the block bottom with a second diameter smaller than the first diameter,
  (2) said second semi-circular hole located so that said second diameter directly faces the block right side and center of the second diameter passes through a left edge of the first semi-circular hole, and
f. said securing handle port comprises,
  (1) a first hole drilled into a centroid of the block right side extending from the block right side straight through to the first rectangular slot, and
g. said static handle port comprises,
  (1) a second hole drilled into a centroid of said block left side extending into the slotted block, and
h. said block pin port comprises,
  (1) a third hole centered nominally in an upper right quadrant of the block right side.
12. The method according to claim 9 wherein,
a. said latch comprises,
  (1) a C-shaped solid of machinable material,
  (2) said C-shaped solid having right angles at outside top left, outside bottom left, and outside bottom right, and
b. said upper latch arm comprises,
  (1) an upper arm of the C-shaped solid,
  (2) said upper arm having an inside right angle and end rounded to form a semi-circle, and
c. said lower latch arm comprises,
  (1) a lower arm of the C-shaped solid,
  (2) said lower arm a solid trapezoid prism, and
d. said latch lock comprises,
  (1) an interior of the C-shaped solid between the upper latch arm and the lower latch arm, and
e. said latch pin port comprises,
  (1) a hole drilled through the upper latch arm,
  (2) centered in the upper latch arm, and
f. said latch notch comprises,
  (1) a semi-circular groove in a far side of the C-shaped solid.
13. The method according to claim 9 wherein,
a. said latch pin comprises,
  (1) a solid cylinder of machinable material, and
b. said latch screw comprises,
  (1) a screw.
14. The method according to claim 9 wherein,
a. said securing handle comprises,
  (1) a first solid cylinder of machinable material comprising,
    (i) a length and diameter to fit said user's hand, and
b. said threaded end of securing handle comprises,
  (1) male threads, and
c. said securing pin port comprises,
  (1) a hole drilled longitudinally into the centroid of the threaded end of securing handle, and
d. said securing pin comprises,
  (1) a second solid cylinder of machinable material,
  (2) press fitted home into said hole, and
e. said first cover for cushion and electrical insulation comprises,
  (1) an elastomeric material fitted tightly to cover said first solid cylinder over end opposite the threaded end of securing handle.
15. The method according to claim 9 wherein,
a. said static handle comprises,
  (1) a first solid cylinder of machinable material comprising,
    (i) a length and diameter to fit said user's hand, and
b. said threaded end of static handle comprises,
  (1) male threads, and
c. said second cover for cushion and electrical insulation comprises,
  (1) an elastomeric material fitted tightly to cover said first solid cylinder over end opposite the threaded end of static handle.
16. The method according to claim 9 wherein,
a. said rod comprises a regular cross-section having a shape of circular, equilateral triangular, square, pentagon, hexagon, heptagon, or octagon, and
b. said slotted block comprises a machinable material with an ultimate tensile strength of at least 50,000 pounds-force per square inch, and
c. said latch, said upper latch arm, and said lower latch arm each comprise a same machinable material with an ultimate tensile strength of at least 50,000 pounds-force per square inch, and
d. said latch pin comprises a 300 series stainless steel, and
e. said securing handle comprises a machinable material with an ultimate tensile strength of at least 50,000 pounds-force per square inch, and
f. said securing pin comprises dowel pin metal with a surface hardness of at least Rockwell C 60 and a single shear strength of at least 11,500 pounds-force, and
g. said static handle comprises a machinable material with an ultimate tensile strength of at least 50,000 pounds-force per square inch, and
h. said first cover for cushion and electrical insulation and second cover for cushion and electrical insulation each comprise the same natural or synthetic rubber with a dielectric strength of at least 400 volts per thousandth inch.

\* \* \* \* \*